2 Sheets--Sheet 1.

T. HAZARD.

Improvement in Straw-Cutters.

No. 128,621.                          Patented July 2, 1872.

WITNESSES.      INVENTOR.

2 Sheets--Sheet 2.

T. HAZARD.
Improvement in Straw-Cutters.

No. 128,621. Patented July 2, 1872.

WITNESSES.
Geo E Upham.
D. D. Faue

INVENTOR.
Thos. Hazard
by Thos. A. Connolly
his atty.

UNITED STATES PATENT OFFICE.

THOMAS HAZARD, OF WILMINGTON, OHIO.

IMPROVEMENT IN STRAW-CUTTERS.

Specification forming part of Letters Patent No. 128,621, dated July 2, 1872.

*To all whom it may concern:*

Be it known that I, THOMAS HAZARD, of Wilmington, in the county of Clinton and State of Ohio, have invented certain Improvements in Straw-Cutters, of which the following is a specification, reference being had to the accompanying drawing, in which—

Figure 1:
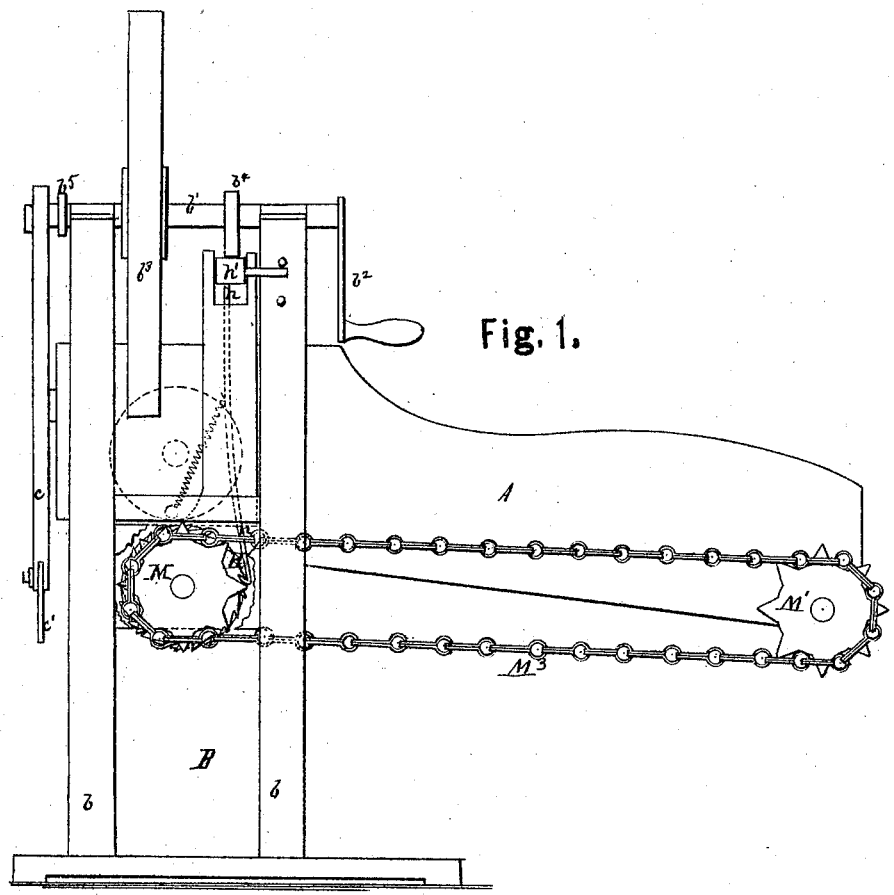
Figure 2:
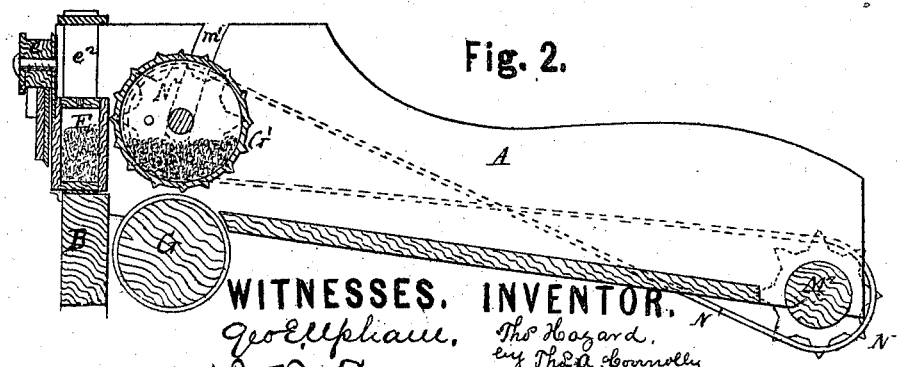
Figure 3:
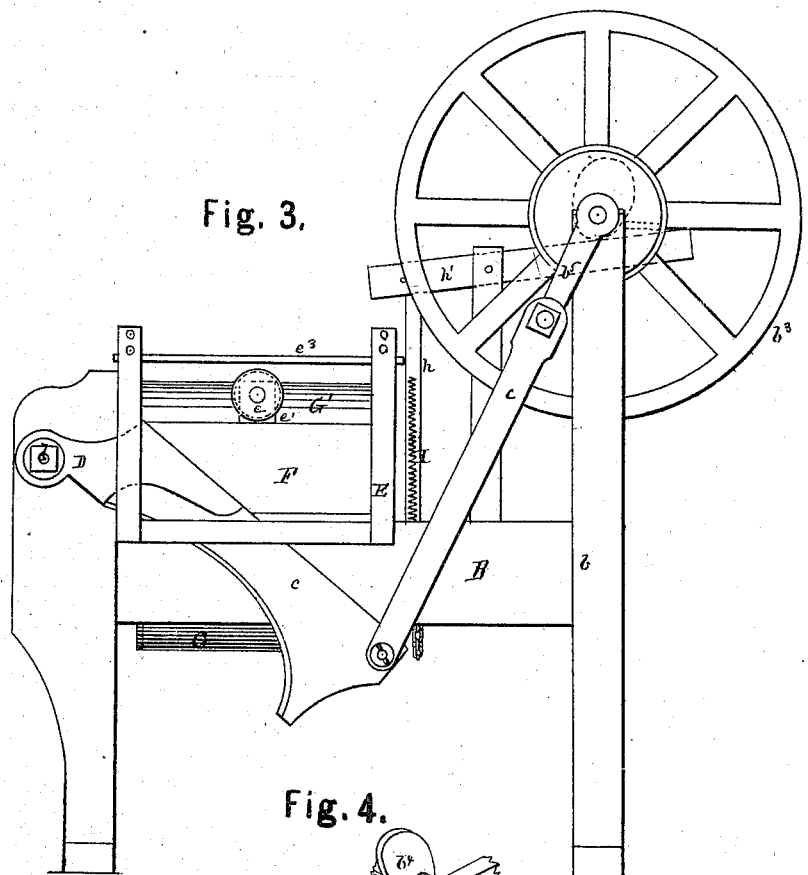
Figure 4:
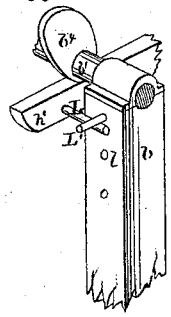

Figure 1 is a side elevation of my invention. Fig. 2 is a vertical longitudinal section. Fig. 3 is a front elevation; and Fig. 4 is a detail view of the same.

This invention has relation to hay and straw cutters; and consists, first, in the construction and novel arrangement of the knife and operating devices; secondly, in the construction and novel arrangement of devices for regulating the feed and operating the feed-rollers; thirdly, in constructing the upper roller and the presser hollow, and afterward properly weighting them by sand, iron-filings, or the like.

Referring to the accompanying drawing, A represents the box of a hay and straw cutter, supported by a frame, B, which extends beyond the right-hand side of the box A, and holds upon the top of its standards $b$ a rotary shaft, $b^1$, provided with an operating-crank, $b^2$, a balance-wheel, $b^3$, an oval cam, $b^4$, and a crank-arm, $b^5$. The crank-arm $b^5$ is connected to a pitman, $c$, the lower end of which is pivoted to the forward end of the knife $c'$. The knife is operated through a vertical plane in front of the box A, and is pivoted directly to the frame B at the left-hand side of the box, as shown, being provided with a strong shank, D, having an eye in the end for such purpose. The knife has a concave cutting-edge, being the kind best adapted to its purpose. The knife is obviously operated by turning the crank $b^2$, and plays through the arc of a circle described from its pivot-bearing $d$. By this arrangement of the knife the greatest and most effective leverage is obtained, and the knife made to cut through the hay or straw gradually, and without danger of stopping. E designates a thin metallic frame attached to the forward end of the box A, and so arranged that the knife may slide or move behind it. F represents the presser, which is intended to compress the hay or straw to the proper condition for being cut. The presser sinks by its own weight, but is raised at each upward stroke of the knife, by reason of the top of the latter coming in contact with a friction-roller, $e$, pivoted to a standard, $e^1$, rising from said presser. The ends of the presser are provided with cleats $e^2$, which slide in grooves in the sides of the box, and pass through slots cut in a transverse bar, $e^3$. G G$'$ designate the feed-rollers, of which the lower, G, is journaled to the frame B, and the upper, G$'$, to the box A. On the shaft of the former is a ratchet-wheel, H, with which engages a dog, $h$, attached to a lever, $h'$, which is pivoted at the top of standard H$'$, located behind the balance-wheel $b^3$. The lever $h'$ passes underneath the cam $b^4$, and is at each revolution thereof depressed so as to cause the dog to engage with the teeth of the ratchet. When the cam rises the dog is raised by means of a spring, I, and the ratchet turned a short distance, the lower feed-roller turning with it. The distance which the roller is turned is regulated according to the number of teeth on the ratchet that the dog slips past in descending from one tooth, with which it has been engaged, to another. Thus, if the dog engages with every tooth successively the roller will be turned only half the distance it would be if the dog engaged with every other tooth. By the distance the roller turns the feed is regulated so as to cut long or short, as may be desired. The action of the dog is partly controlled by the lever $h'$, which is armed near its outer end with a finger, L$'$, which projects across one side of the standard $b$, as shown. In this standard is bored a number of holes, $l$, to receive at different times a pin, L$'$, which acts as a stop to limit the upward movement of the outer end of the lever $h'$. By this device the action of the dog may be governed so that it may be made to turn the roller as far or as little as may be required. M designates a spur-wheel on the shaft of the roller G; M$^1$, a similar wheel on one end of the shaft of a roller, M$^2$, located at the rear end of the box A. M$^3$ designates a chain connecting the wheels M M$^1$ and communicating motion from the roller G to the roller M$^2$, causing both to rotate in the same direction and with the same intermittent movement. The roller M$^2$ assists the feeding at the rear end of the machine. On the other end of the shaft thereof is another spur-wheel, N, connected by means of a chain or equivalent, N$^1$, to a spur-wheel, N$^2$, on the end of the shaft of the upper roller G′, said chain being crossed to give the proper direction to the revolution of the roller G′. The shaft of the roller G′ has its bearings in slots or grooves, $m'$, cut in the sides of the box A in the direction of an arc of a circle described from the center of the roller $M^2$. By this arrangement the roller G′ is enabled to rise and fall so as to adapt itself to the varying bulk of hay or straw under it without in the least affecting the tension of the chain or belt $N^1$.

By the herein-described arrangement of wheels and belts it will be seen that I dispense altogether with the cumbersome and expensive feed-apron commonly used in hay-cutters. The roller G may be made of wood and covered with any suitable material, as cow-hide or leather.

The upper roller G′ and the presser F are to be made heavy, in order that they may be caused to sink and compress the hay and straw by their own weight.

Usually the upper roller and the presser of hay-cutters are constructed at once of the proper weight, as by casting them of metal; or they are connected with spring or other operating devices to depress them. In the former case the cost of manufacture is considerable, and the trouble and expense of packing and transporting greater than if the devices were of less weight. In the latter case, as when the roller or presser is not heavy enough, the machinery of the hay-cutter is more complicated than it would otherwise be. I overcome these disadvantages by constructing both the presser and upper roller hollow, and afterward, when they are ready for use, filling them, through suitable apertures, with sand, iron-filings, or any other inexpensive filling. I am thus enabled to construct the presser and roller of the lightest form compatible with strength, and thereby greatly lessen the cost of manufacture as well as that of transportation.

The roller and presser may be made of any material, but I prefer constructing them of metal. The roller is constructed or provided with a serrated or roughened surface to cause it to take hold of the straw or hay.

Having described my invention, I claim as new and desire to secure by Letters Patent—

1. The knife $e^1$ having a concave cutting-edge, and having one end pivoted to the frame B and the other end pivoted to a pitman $c$, coupled to an arm on the end of the rotary shaft $b^1$, substantially as specified.

2. The adjustable pin L′ applied to the stationary frame support or standard $b$, located at one side of the box, in combination with the rock-shaft or lever $h'$, armed at its outer end with the rigid pin L connected to the dog $h$, and actuated by the cam $b^4$, all substantially as and for the purpose specified.

3. A pressure feed-roller for a straw-cutter, constructed of thin material, with its interior hollow, and adapted to the reception of heavy filling, substantially as specified.

4. A presser-slide for a straw-cutter, constructed of thin metal or its equivalent, and adapted to the reception of heavy filling, substantially as specified.

In testimony that I claim the above I have hereunto subscribed my name in the presence of two witnesses.

THOMAS HAZARD.

Witnesses:
ANTHONY A. CONNOLLY,
THOS. A. CONNOLLY.